United States Patent
Chen et al.

(10) Patent No.: US 9,547,185 B2
(45) Date of Patent: Jan. 17, 2017

(54) SPATIAL LIGHT MODULATOR BASED ON METAMATERIAL STRUCTURE AND PREPARATION METHOD THEREOF

(71) Applicant: Suzhou Institute of Nano-Tech and Nano-Bionics, Chinese Academy of Sciences, SIP Suzhou (CN)

(72) Inventors: Qin Chen, SIP Suzhou (CN); Shichao Song, SIP Suzhou (CN)

(73) Assignee: Suzhou Institute of Nano-Tech and Nano Sciences, Chinese Academy of Sciences, Suzhou (CN)

( * ) Notice: Subject to any disclaimer, the term of this patent is extended or adjusted under 35 U.S.C. 154(b) by 0 days.

(21) Appl. No.: 14/899,071

(22) PCT Filed: Sep. 29, 2014

(86) PCT No.: PCT/CN2014/087756
§ 371 (c)(1),
(2) Date: Feb. 18, 2016

(87) PCT Pub. No.: WO2015/051722
PCT Pub. Date: Apr. 16, 2015

(65) Prior Publication Data
US 2016/0209680 A1  Jul. 21, 2016

(30) Foreign Application Priority Data
Oct. 12, 2013  (CN) .......................... 2013 1 0476509

(51) Int. Cl.
*G02B 26/00* (2006.01)
*G02F 1/00* (2006.01)
(Continued)

(52) U.S. Cl.
CPC ............. *G02F 1/0018* (2013.01); *G02B 1/002* (2013.01); *G02B 1/14* (2015.01); *G02B 26/00* (2013.01);
(Continued)

(58) Field of Classification Search
CPC ...... G02F 1/015; G02F 1/0009; G02F 1/0063; G02F 1/35; G02F 2001/0151; G02F 2001/0155; G02F 1/0018; G02F 1/0081; G02F 1/19; G02B 26/00; G02B 1/002; G02B 1/14; Y10S 977/721; Y10S 977/888; Y10S 977/89; Y10S 977/932
(Continued)

(56) References Cited

U.S. PATENT DOCUMENTS

2015/0357504 A1* 12/2015 Chen .................... H01L 31/028
257/27

FOREIGN PATENT DOCUMENTS

| CN | 102303429 A | 1/2012 |
| CN | 102881728 A | 1/2013 |

OTHER PUBLICATIONS

International Search Reports of corresponding international application PCT/CN2014/087756.

* cited by examiner

*Primary Examiner* — Loha Ben
(74) *Attorney, Agent, or Firm* — Wang Law Firm, Inc.

(57) ABSTRACT

A spatial light modulator based on a metamaterial structure and a preparation method thereof. The spatial light modulator includes an array of optical function elements and a control circuit. The optical function element includes a metamaterial structure formed by a metal nanostructure layer and a metal reflector layer, with a medium layer and nonmetal conducting material layer being provided between
(Continued)

the metal nanostructure layer and the metal reflector layer. The spatial light modulator is simple in structure, high in integration, easy in manufacture and low in cost. Furthermore, the spatial light modulator is capable of high-speed modulation, the depth of modulation is controlled easily, and a low drive voltage may be obtained.

12 Claims, 15 Drawing Sheets

(51) Int. Cl.
  *G02F 1/015* (2006.01)
  *G02B 1/14* (2015.01)
  *G02B 1/00* (2006.01)
  *G02F 1/19* (2006.01)
(52) U.S. Cl.
  CPC ............ *G02F 1/0081* (2013.01); *G02F 1/015* (2013.01); *G02F 1/19* (2013.01); *G02F 2001/0155* (2013.01); *Y10S 977/721* (2013.01); *Y10S 977/888* (2013.01); *Y10S 977/89* (2013.01); *Y10S 977/932* (2013.01)
(58) Field of Classification Search
  USPC .......... 359/259, 290, 291, 295, 298; 257/27; 136/253
  See application file for complete search history.

SPATIAL LIGHT MODULATOR BASED ON METAMATERIAL STRUCTURE AND PREPARATION METHOD THEREOF

TECHNICAL FIELD OF THE INVENTION

The present invention relates to a spatial light modulator and a preparation method thereof, in particular to a reflective spatial light modulator based on metamaterial and conductive oxides and a preparation method thereof, belonging to the technical field of spatial light modulators.

BACKGROUND OF THE INVENTION

Optical information processing, as a novel technology which has been developed in recent years, due to its high processing speed, large information flow and the like, especially excellent interference resistance against light waves and capability of transferring and processing loaded information concurrently, has great application value in the field of information, national defense and the like. A spatial light modulator is a device for modulating spatial distribution of the light waves, and specifically a device for spatially and temporally transforming or modulating one-dimensional or two-dimensional distribution of certain properties (such as amplitude, phase, polarization and frequency) of the light waves thus to write information loaded by a source signal into incident light. At present, the technologies to realize a spatial light modulator mainly include electro absorption modulation, electro-optical modulation, liquid crystal, MEMS and the like. The low-speed operation of the liquid crystal modulation and MEMS modulation can not meet the application of high-speed modulation; the electro absorption modulation has high cost as it is generally based on gallium arsenide quantum well material, the process is very complicated since the entire structure often requires epitaxy of dozens of layers of heterogeneous material, and the uniformity of a plurality of layers of material further limits the size of the array as well as the depth of modulation; and as the electro-optical modulation is generally based on nonlinear crystal material or polymers, this results in large device volume and high drive voltage.

SUMMARY OF THE INVENTION

An objective of the present invention is to provide a spatial light modulator based on a metamaterial structure and a preparation method thereof, in order to overcome deficiencies in the prior art.

The present invention employs the following technical solution to achieve the aforementioned objective.

A spatial light modulator based on a metamaterial structure is provided, including an array of optical function elements and a control circuit, the optical function element includes a metamaterial structure including a metal nanostructure layer and a metal reflector layer, with a medium layer and a nonmetal conducting material layer being provided between the metal nanostructure layer and the metal reflector layer; and the impedance Z of the metamaterial structure, at a set frequency and under a set bias voltage, is equal to or approximate to 376.7Ω, $Z=\sqrt{\mu/\epsilon}$, where $\epsilon$ and $\mu$ are an effective dielectric constant and magnetic permeability of the metamaterial structure, respectively.

Herein, "approximate to" means that the deviation amplitude is within ±5%, that is, the impedance Z of the metamaterial structure, at a set frequency and under a set bias voltage, is 357.865Ω to 395.535Ω.

As one of feasible implementations, the metamaterial structure further includes a substrate on which the metal reflector layer or the metal nanostructure layer is arranged.

As one of feasible implementations, the metamaterial structure further includes a transparent protection layer provided on the metal nanostructure layer or the metal reflector layer.

Further, in the metamaterial structure, the positions of the medium layer and the nonmetal conducting material layer may be changed with each other.

Further, the metal nanostructure layer and/or the metal reflector layer may include, but not limited to, a single-metal layer formed of any one or an alloy layer formed of more than any two of gold, platinum, silver, copper, aluminum and titanium.

Further, the metal nanostructure layer and/or the metal reflector layer include(s) a stacked structure formed of more than two single-metal layers, more than two alloy layers, or, more than one single-metal layer and more than one alloy layer.

Further, the metal nanostructure layer includes a one-dimensional or two-dimensional nanostructure.

Further, the period of the grating is preferably 100 nm to 2000 nm, and the thickness thereof is 5 nm to 100 nm.

Further, the thickness of the metal reflector layer is over 50 nm, preferably below 200 nm.

Further, the thickness of the medium protection layer is preferably 5 nm to 100 nm.

Further, the material of the medium layer includes, but is not limited to, silicon dioxide, silicon nitride, magnesium fluoride, zinc selenide and aluminum oxide and the like.

Further, material for forming the nonmetal conducting material layer may be selected from, but not limited to, indium tin oxide, zinc oxide, tin oxide, indium oxide, titanium nitride, zirconium nitride, and single-layer or multi-layer graphene.

Further, the transparent protection layer is mainly formed of material having low absorptivity to incident waves, for example, but not limited to, silicon dioxide, silicon nitride or aluminum oxide.

Further, the drive voltage of the spatial light modulator may be below 5 V, more preferably below 1 V.

Further, the spatial light modulator may work in three states, i.e., carrier accumulation, carrier depletion and intrinsic state without bias voltage, under different applied voltage.

Further, the spatial light modulator shows different reflectivity in response to different voltages within a range of working voltage, thus to realize light modulation.

Further, the spatial light modulator may form a two-dimensional array from a number of light modulator units, to each of which is applied a different working voltage thus to realize different spatial distribution of the reflected light, i.e., spatial light modulation.

As one of the preferred implementations, a preparation method of the spatial light modulator based on a metamaterial structure may include the following steps of:

(1) preparing a substrate including a control circuit on a silicon wafer by a standard CMOS process;

(2) preparing a metal reflector layer on the substrate by a metal film deposition process;

(3) preparing a medium layer and a nonmetal conducting material layer on the metal reflector layer by the film deposition process;

(4) preparing a metal nanostructure layer on the nonmetal conducting material layer by the film deposition process and a micro-nano machining process;

(5) preparing a transparent protection layer on the metal nanostructure layer by the film deposition process; and (6) preparing interconnected electrodes by the micro-nano machining process.

In the present invention, a novel spatial light modulator based on metamaterial is established, wherein the electromagnetic property of the metamaterial mainly depends upon a sub-wavelength structure itself, so the metamaterial has a great freedom of design and may control the absorption peak within a large range of wavelength. Furthermore, the sub-wavelength structure may be optimized so that both the effective dielectric constant and the magnetic permeability of the metamaterial are approximate to the dielectric constant and the magnetic permeability of a free space at a certain wavelength and under a set bias voltage, thus to obtain zero reflection. Preferably, combining the sub-wavelength structure and the reflector may further realize the complete localization of electromagnetic waves of certain wavebands.

In the present invention, the metal reflector layer reflects incident light completely; the metal nanostructure layer, the medium layer and the nonmetal conducting material layer together realize wave vector matching conditions at certain wavelengths, thus to obtain low reflection; the metal reflector layer and the metal nanostructure layer may be used as two electrodes to inject or extract carriers to and from the nonmetal conducting material layer, the presence of the non-conducting medium layer realizes the accumulation or depletion of carriers on an interface between the medium layer and the nonmetal conducting material layer, by modulating the carriers under applied bias voltage, i.e., electrically modulating change in the reflectivity resulted from the accumulation or depletion of carriers in the nonmetal conducting material layer, the modulation of the reflected light intensity, i.e., change of the reflectivity between the maximum one and the minimum one, is realized, and a low drive voltage is obtained. Meanwhile, by applying a bias voltage on two sides of the nonmetal conducting material layer, accumulation or depletion of carriers will be formed rapidly, that is, a very high response speed will be obtained.

Additionally, the spatial light modulator of the present invention, as it requires no material epitaxy and flip-chip bonding process similar to those required by an electro absorption modulator, may be integrated on a control circuit by the film deposition process and the micro-nano machining process to realize complete integration. Therefore, a large array of spatial light modulators may be manufactured at low cost.

BRIEF DESCRIPTION OF THE DRAWINGS

In order to explain the content of the present invention more clearly, embodiments will be introduced briefly as below. The present invention provides preferred embodiments, but should not be interpreted as being limited to those embodiments to be explained hereinafter. The accompanying drawings are schematic diagrams of idealized embodiments of the present invention. The accompanying drawings, as schematic diagrams, should not be interpreted as strictly reflecting the proportional relation of geometries. The embodiments of the present invention should not be interpreted as being limited to specific shapes of the regions shown in the accompany drawings. The representations in the accompany drawings are exemplary, and should not be interpreted as limiting the scope of the present invention, in which.

DETAILED DESCRIPTION OF THE INVENTION

One aspect of the present invention provides a spatial light modulator based on a metamaterial structure. The spatial light modulator mainly consists of an array of optical function elements and a control circuit, wherein each optical function element includes a metamaterial structure, and the metamaterial structure at least includes a metal nanostructure layer and a metal reflector layer, and a medium layer and nonmetal conducting material layer being provided between the metal nanostructure layer and the metal reflector layer.

The metamaterial structure is optimized so that it may have high absorbency at narrow bands.

The modulation principle of the spatial light modulator of the present invention is to, based on change in the refractive index of the material resulted from the accumulation or depletion of carriers formed in the nonmetal conducting material layer under a bias voltage, modulate the position of an absorption peak at a narrow band, thus to realize continuous change, between high reflection and high absorption, of light waves at a certain wavelength, and further to modulate the reflected light intensity.

Figure 1:
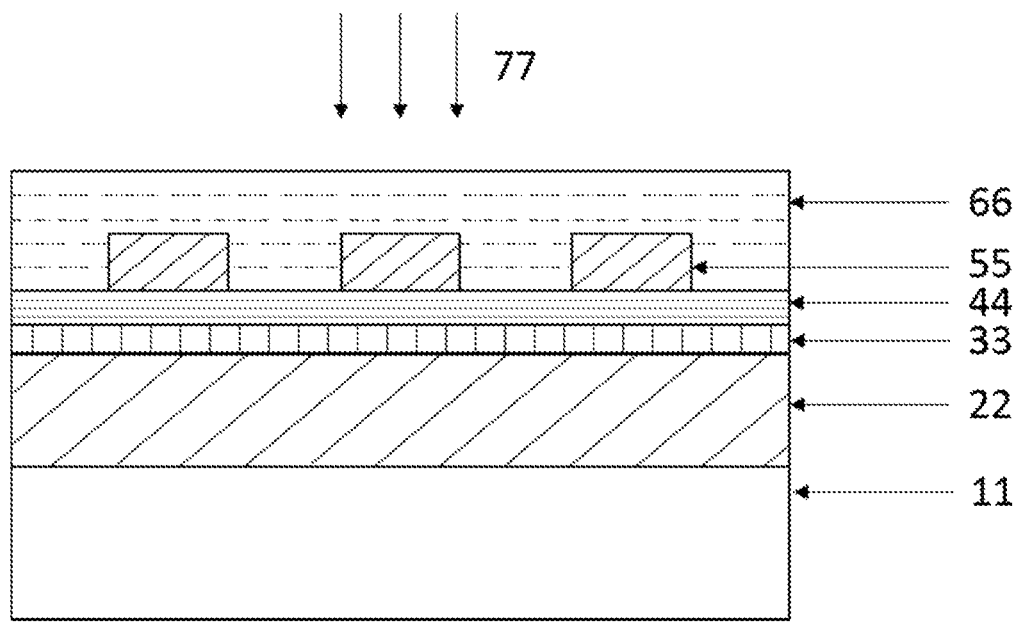
FIG. 1 is a longitudinal cross-section view of a spatial light modulator based on a metamaterial structure according to one optional implementation of the present invention.

In one preferred implementation of the present invention, referring to FIG. 1, the spatial light modulator based on a metamaterial structure includes a substrate 11, a metal reflector layer 22, a medium layer 33, a nonmetal conducting material layer 44, a metal nanostructure layer 55 and a transparent protection layer 66. Each of or both the substrate 11 and the transparent protection layer 66 may be removed according to actual situations to form an entire device (referring to FIG. 2). Additionally, the positions of the medium layer 33 and the nonmetal conducting material layer 44 may be changed with each other. The metamaterial structure is designed so that the metamaterial structure has low reflection, when no bias voltage is applied to the modulator, at a position within the wavelength of incident waves.

The optical function element may form a one-dimensional (FIG. 3) or two-dimensional (FIG. 4) array unit and may address independently, and the modulation of the reflected light intensity of each unit is controlled by the control circuit.

Figure 7:
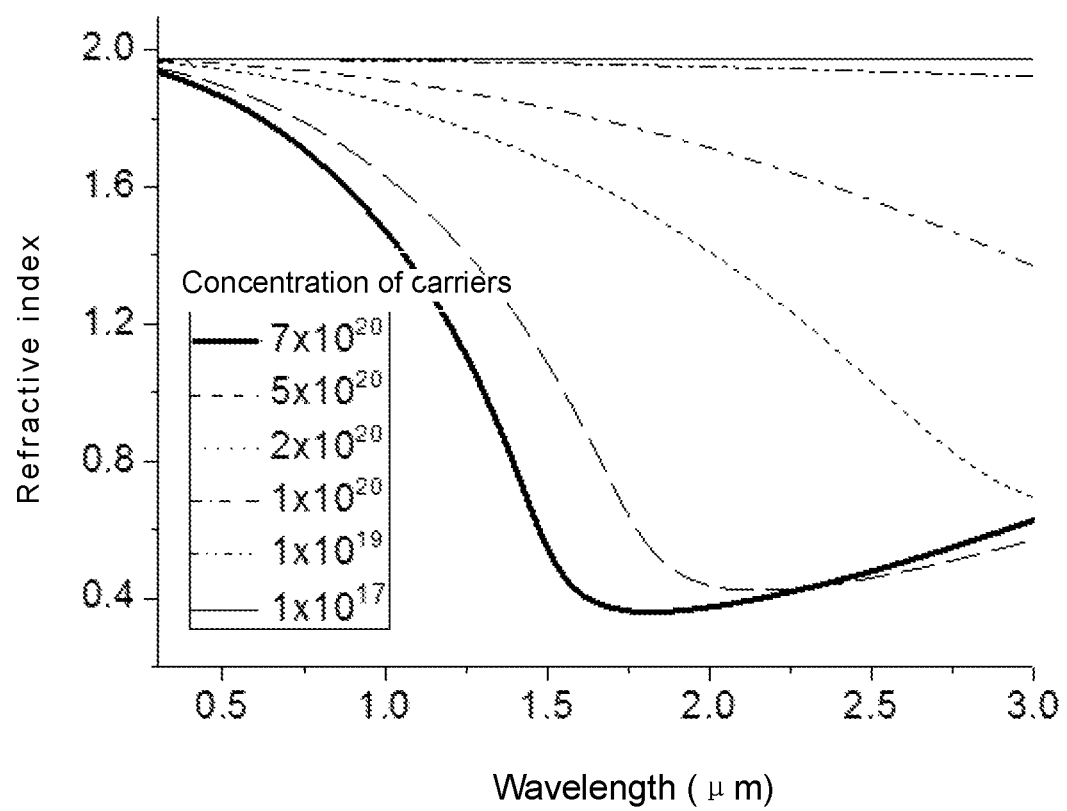
FIG. 7 is a view showing change in the reflectivity of a nonmetal conducting material layer in a spatial light modulator, having a high modulation rate, based on a metamaterial structure, along with the concentration of carriers, resulted from accumulation or depletion of carriers, according to one optional implementation.

The working principle of the spatial light modulator is as follows: accumulation or depletion of carriers, on an interface between the nonmetal conducting material layer 44 and the medium layer 33, occurs in the nonmetal conducting material layer 44 and the refractive index changes correspondingly, after a bias voltage is applied to the metal nanostructure layer 55 and the metal reflector layer 22 (FIG. 7). Incident electromagnetic waves 77 at a certain wavelength when a dielectric constant tends to zero, resulted from this change, are incident to the array of optical function elements, and the metamaterial structure on the optical function element optimizes approximately 100% of absorption at this wavelength, that is, the reflected light of the unit is approximate to zero. Accumulation or depletion of carriers occurs in the nonmetal conducting material layer 44, after applying a bias voltage to the metal nanostructure layer 55 and the metal reflector layer 22, thereby resulting in change in the refractive index of the nonmetal conducting material layer, further changing an absorption value at the wavelength of the incident light. Furthermore, the absorption value changes as the applied bias voltage changes, and the modulation of the reflected light intensity from the optical function elements is realized. Or, in other words, the position of the low reflection peak of the metamaterial structure thus changes, the modulation of the reflected light intensity at the wavelength of the incident waves is realized, and then, by controlling the bias voltage of each unit on the array of optical function elements independently, different spatial intensity distributions of the reflected light may be obtained thus to realize spatial light modulation.

Preferably, the spatial light modulator may include a substrate 11, a metal reflector layer 22, a medium layer 33, a nonmetal conducting material layer 44, a metal nanostructure layer 55 and a transparent protection layer 66, wherein the metal reflector layer 22, the medium layer 33, the nonmetal conducting material layer 44 and the metal nanostructure layer 55 constitute a metamaterial structure, the impedance Z of which at a set frequency and under a set bias voltage, is equal to or approximate to 376.7Ω, $Z=\sqrt{\mu/\in}$, where $\in$ and $\mu$ are an effective dielectric constant and magnetic permeability of the metamaterial structure, respectively.

Further, the substrate 11 is preferably silicon, and a control circuit is prepared.

Further, metal material of the metal nanostructure layer 55 and the metal reflector layer 22 may be selected from, but not limited to, a single-metal layer formed of gold, platinum, silver, copper, aluminum or titanium, or an alloy layer thereof, or a stacked structure formed of a plurality of single-metal layers or alloy layers.

Further, the metal nanostructure layer 55 is a one-dimensional grating or two-dimensional grating, the period of which is 100 nm to 2000 nm and the thickness thereof is 5 nm to 100 nm.

Further, the thickness of the metal reflector layer 22 is not less than 50 nm.

Further, material of the medium layer 33 may be selected from, but not limited to, silicon dioxide, silicon nitride, magnesium fluoride, zinc selenide, aluminum oxide and the like.

Further, the thickness of the medium layer 33 is preferably 5 nm to 100 nm.

Further, material of the nonmetal conducting material layer 44 may be selected from, but not limited to, indium tin oxide, zinc oxide, tin oxide, indium oxide, titanium nitride, zirconium nitride, and single-layer or multi-layer graphene.

Further, the transparent protection layer 66 is mainly formed of material having low absorptivity to incident waves, for example, silicon nitride, silicon dioxide, aluminum oxide and the like.

Further, the working wavelength bandwidth of the spatial light modulator of the present invention may be over 50 nm, up to 200 nm to the maximum extent, much superior to an existing high-speed GaAs electro absorption modulator (with the maximum working wavelength bandwidth of just 10 nm), and the spatial light modulator can work at multiple wavelengths. This means a lot for secure communication and improvement of interference resistance.

Of course, the spatial light modulator of the present invention may work at narrow bandwidths. For example, its working wavelength bandwidth may be below 50 nm.

Another aspect of the present invention provides a method for preparing the spatial light modulator as mentioned above, including: preparing a control circuit on a substrate; preparing a metal reflector, a medium layer, and a nonmetal conducting material layer; then forming a metal nanostructure layer and a transparent protection layer by machining; and performing electrical interconnection.

Further, as one of the preferred implementations, the preparation method may include the following steps of:

(1) preparing a substrate including a control circuit on a silicon wafer by a standard CMOS process;

(2) preparing a metal reflector layer on the substrate by a metal film deposition process;

(3) preparing a medium layer and a nonmetal conducting material layer on the metal reflector layer by the film deposition process;

(4) preparing a metal nanostructure layer on the nonmetal conducting material layer by the film deposition process and a micro-nano machining process;

(5) preparing a transparent protection layer on the metal nanostructure layer by the film deposition process; and (6) preparing interconnected electrodes by the micro-nano machining process.

In conclusion, the spatial light modulator of the present invention is simple in structure, high in integration, easy in manufacture and low in cost. Furthermore, the spatial light modulator of the present invention can realize high-speed modulation, the depth of modulation is controlled easily, and a low drive voltage may be obtained.

Technical solutions of the present invention will be explained below in detail with reference to related accompany drawings by some specific embodiments.

Embodiment 1

Figure 3:
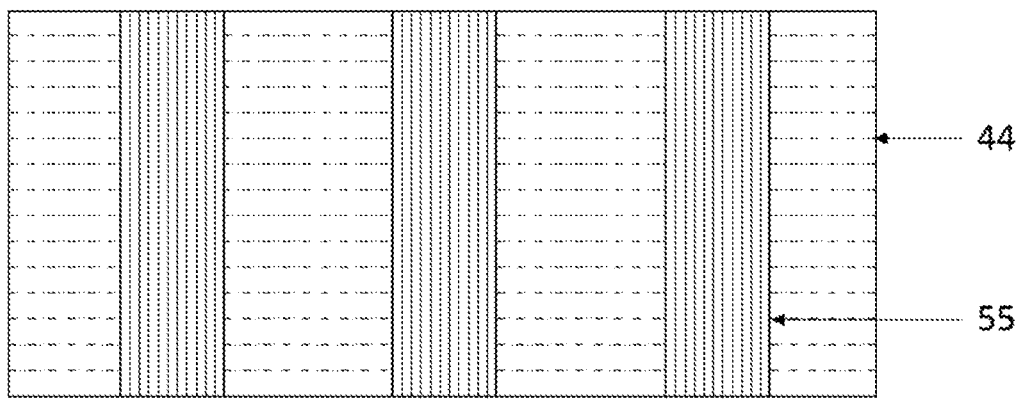
FIG. 3 is a top view of a spatial light modulator based on a metamaterial structure applying a one-dimensional grating structure according to one optional implementation of the present invention.
Figure 4:
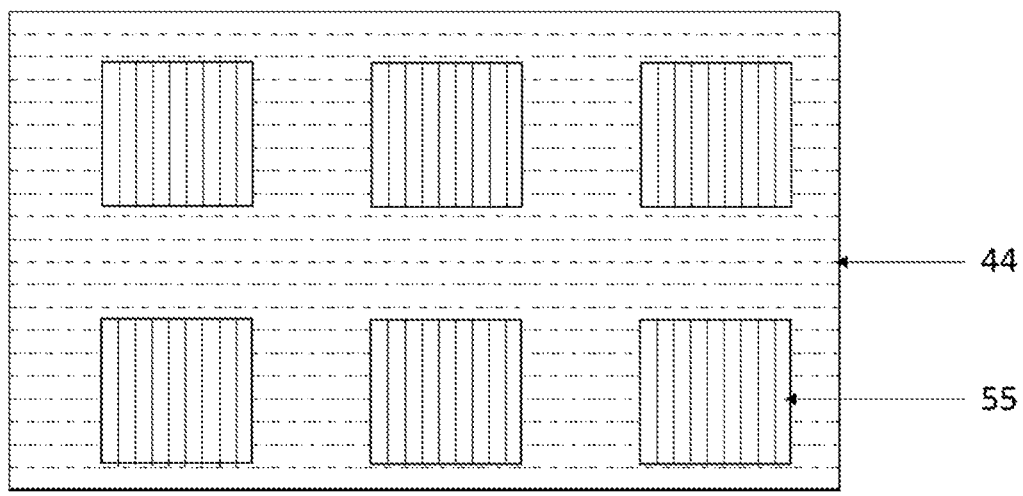
FIG. 4 is a top view of a spatial light modulator based on a metamaterial structure applying a two-dimensional grating structure according to one optional implementation of the present invention.
Figure 8:
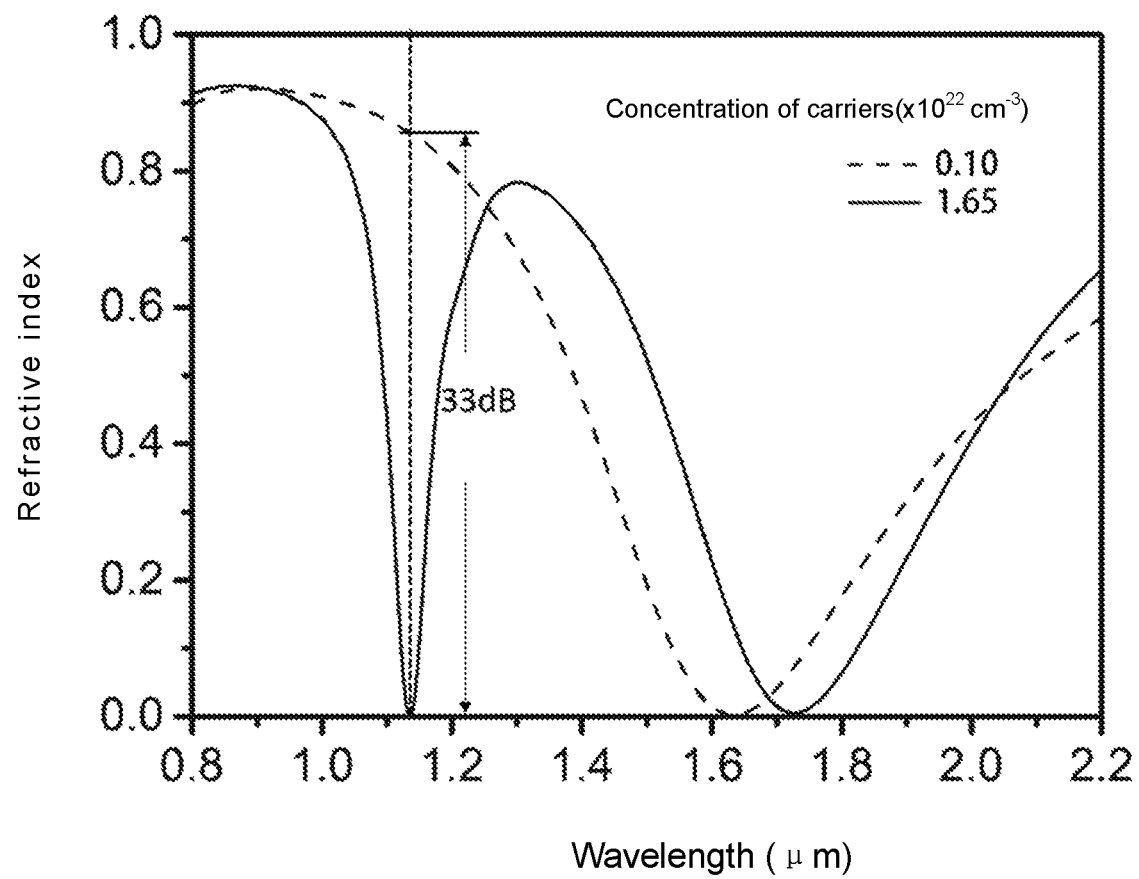
FIG. 8 is a working state diagram of the spatial light modulator, having a high modulation rate, based on a metamaterial structure according to one optional implementation.

Continuously referring to FIG. 1 and FIG. 3, the spatial light modulator based on a metamaterial structure in this embodiment includes a substrate 11 (silicon) having a control circuit, a metal reflector 22 (gold), a medium layer 33 ($SiO_2$), a nonmetal conducting material layer 44 (ITO), a metal nanostructure layer 55 (gold) and a transparent protection layer 66 ($SiO_2$). Structures of the device are selected as follows: the thickness of the metal nanostructure layer 55 is 50 nm, and furthermore, the metal nanostructure layer 55 is a one-dimensional grating structure, and the width of the metal grating is 240 nm and the period thereof is 300 nm; the thickness of the nonmetal conducting material layer 44 is 10 nm; the thickness of the medium layer 33 is 15 nm; the thickness of the metal reflector 22 is 55 nm; and the thickness of the transparent protection layer 66 is 70 nm. As shown in FIG. 8, the concentration of carriers in the nonmetal conducting material layer 44 (ITO) is $1\times10^{21}$ $cm^{-3}$ when there is no bias voltage (0 V); the reflectivity of the optical function elements is 0.86 at a working wavelength of 1.135 μm, when the polarization direction of the incident light is perpendicular to the grating; when a certain bias voltage (for example, 1 V) is applied so that the concentration of carriers in the carrier accumulation layer in the nonmetal conducting material layer 44 (ITO) is increased to $1.65\times10^{22}$ $cm^{-3}$, the reflectivity of the optical function elements is $4\times10^{-4}$. The depth of modulation reaches 33 dB. When the voltage is modulated so that the nonmetal conducting material layer 44 (ITO) changes from no carrier accumulation (the concentration of carriers is $1\times10^{21}$ $cm^{-3}$) to the concentration of carriers of $1.65\times10^{22}$ $cm^{-3}$ in the carrier accumulation layer, the reflectivity of the optical function elements changes from 0.86 to $4\times10^{-4}$. Regulation of grayscale may be realized. Since each unit in the array of optical function elements can address independently, the entire spatial light modulator may realize spatial modulation of the reflected light intensity.

This embodiment is realized by a following preparation method:

(1) preparing a substrate including a control circuit on a silicon wafer by a standard CMOS process;

(2) preparing a metal reflector layer on the substrate by a metal film deposition process;

(3) preparing a medium layer and a nonmetal conducting material layer on the metal reflector layer by the film deposition process;

(4) preparing a metal nanostructure layer on the nonmetal conducting material layer by the film deposition process and a micro-nano machining process;

(5) preparing a transparent protection layer on the metal nanostructure layer by the film deposition process; and (6) preparing interconnected electrodes by the micro-nano machining process.

Embodiment 2

Figure 2:
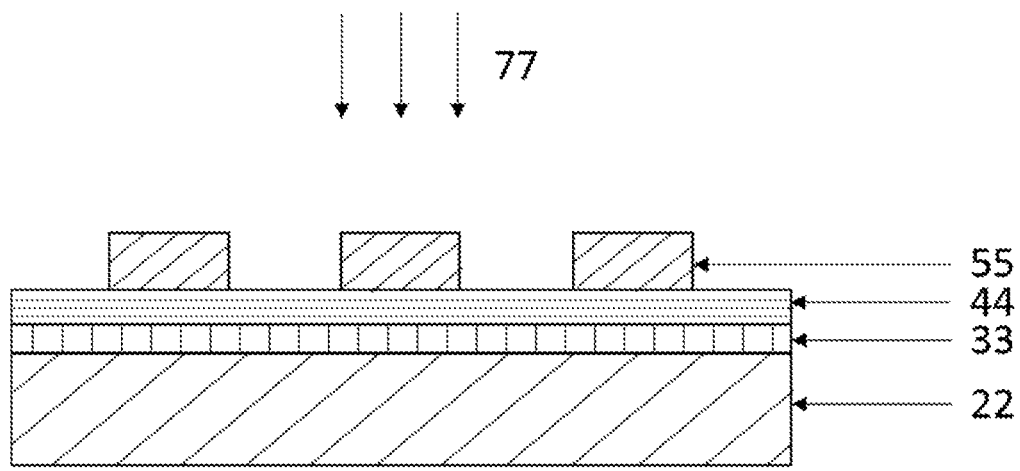
FIG. 2 is a longitudinal cross-section view of the spatial light modulator based on a metamaterial structure according to another optional implementation of the present invention.
Figure 9:
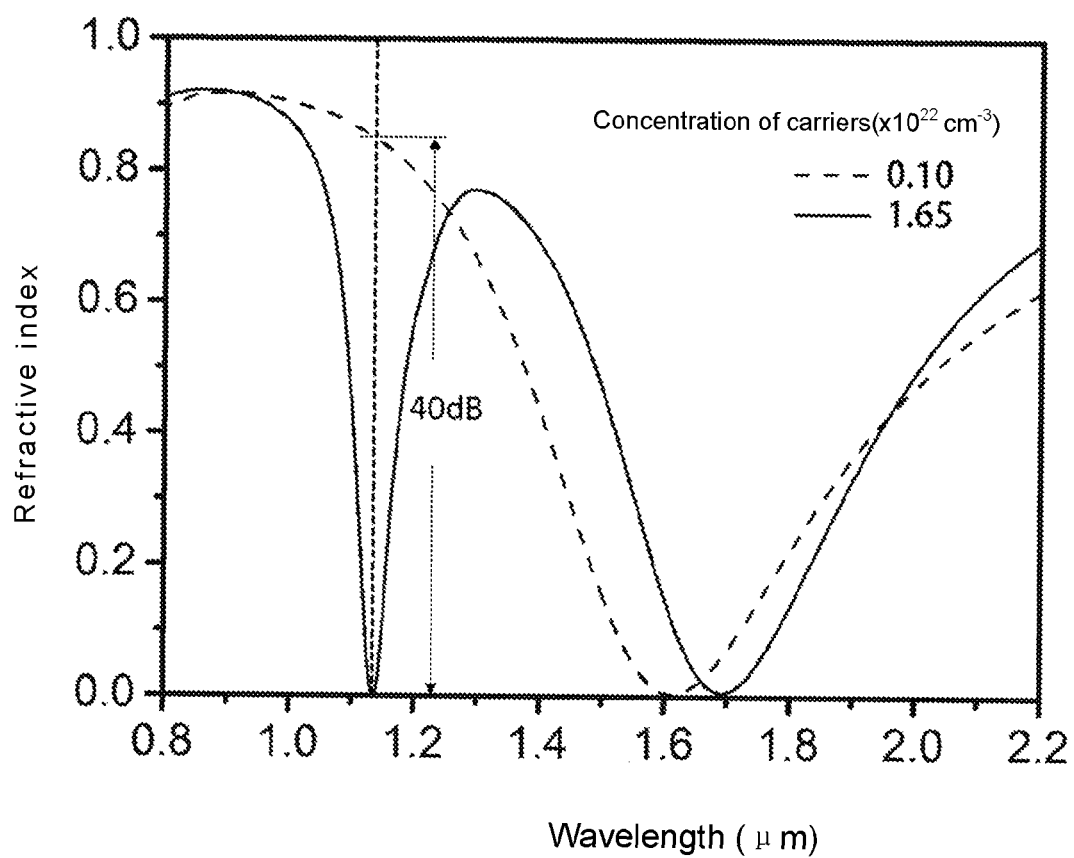
FIG. 9 is a working state diagram of the spatial light modulator, having a high modulation rate, based on a metamaterial structure according to one optional implementation.

Unlike Embodiment 1, a metal nanostructure layer 55 of a two-dimensional periodic structure is employed in this embodiment, referring to FIG. 2 and FIG. 4 again. Structures of the device are selected as follows: the thickness of the metal nanostructure layer 55 is 50 nm, and furthermore, the metal nanostructure layer 55 is a two-dimensional grating structure, and the width of the metal grating is 270 nm and the period thereof is 300 nm; the thickness of the nonmetal conducting material layer 44 is 10 nm; the thickness of the medium layer 33 is 15 nm; and the thickness of the metal reflector 22 is 55 nm. As the metal nanostructure layer 55 is symmetric, the spatial light modulator in this embodiment has same effect with respect to various kinds of normally incident polarized light. That is, as shown in FIG. 9, the concentration of carriers in the nonmetal conducting material layer 44 (ITO) is $1\times10^{21}$ $cm^{-3}$ when there is no bias voltage (0 V); the reflectivity of the optical function elements is 0.85 at a working wavelength of 1.135 μm, when the polarization direction of the incident light is perpendicular to the grating; when a certain bias voltage (for example, 1 V) is applied so that the concentration of carriers in the carrier accumulation layer in the nonmetal conducting material layer 44 (ITO) is increased to $1.65\times10^{22}$ $cm^{-3}$, the reflectivity of the optical function elements is $8\times10^{-5}$, and the depth of modulation reaches 40 dB. When the voltage is modulated so that the nonmetal conducting material layer 44 (ITO) changes from no carrier accumulation (the concentration of carriers is $1\times10^{21}$ $cm^{-3}$) to the concentration of carriers of $1.65\times10^{22}$ $cm^{-3}$ in the carrier accumulation layer, the reflectivity of the optical function elements changes from 0.85 to $8\times10^{-5}$. Regulation of grayscale may be realized.

Embodiment 3

Figure 5:
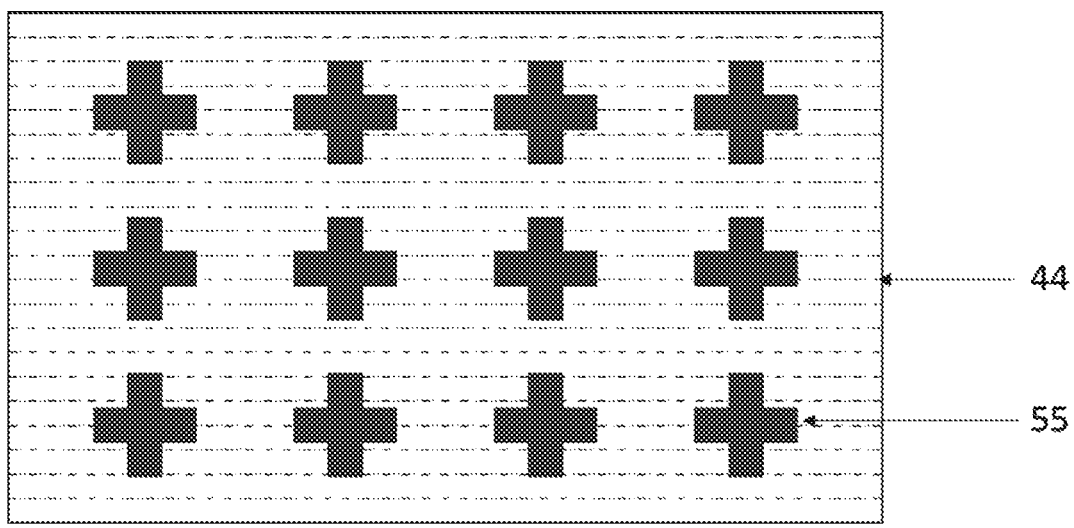
FIG. 5 is a top view of a spatial light modulator based on a metamaterial structure applying a cross nanostructure according to one optional implementation of the present invention.
Figure 10:
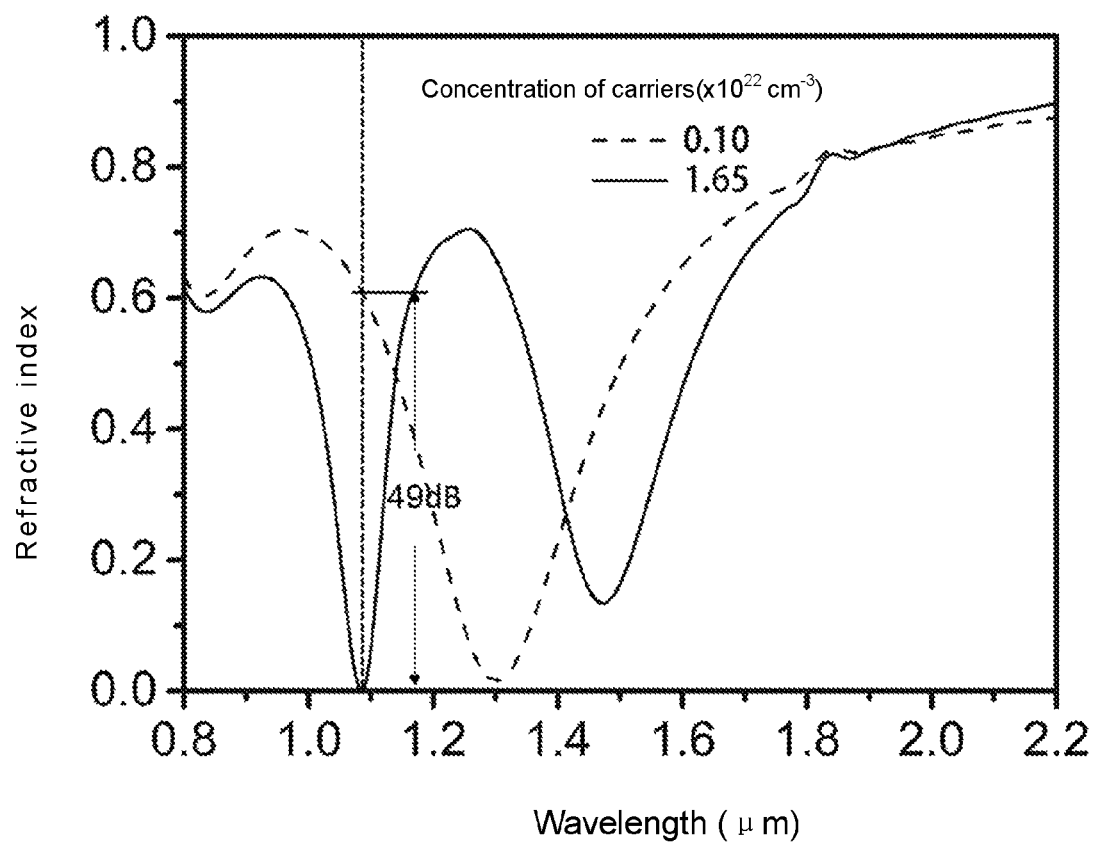
FIG. 10 is a working state diagram of the spatial light modulator, having a high modulation rate, based on a metamaterial structure according to one optional implementation.

Unlike Embodiment 2, a periodic metal nanostructure layer 55 employed in this embodiment is a metal cross array structure, referring to FIG. 2 and FIG. 5. Structures of the device are selected as follows: material of the transparent protection layer 66 is aluminum oxide ($Al_2O_3$), and the thickness thereof is 100 nm; the thickness of the metal nanostructure layer 55 is 50 nm, and the metal nanostructure layer 55 is an aluminum cross array structure, the length and width of which is 250 nm and 50 nm respectively, and the period of which is 300 nm; the thickness of the nonmetal conducting material layer 44 is 10 nm; the thickness of the medium layer 33 ($Al_2O_3$) is 15 nm; and the thickness of the metal reflector 22 is 60 nm. As shown in FIG. 10, the concentration of carriers in the nonmetal conducting material layer 44 (ITO) is $1\times10^{21}$ $cm^{-3}$ when there is no bias voltage (0 V); the reflectivity of the optical function elements is 0.61 at a working wavelength of 1.085 μm, when the polarization direction of the incident light is perpendicular to the grating; when a certain bias voltage is applied so that the concentration of carriers in the carrier accumulation layer in the nonmetal conducting material layer 44 (ITO) is increased to $1.65\times10^{22}$ $cm^{-3}$, the reflectivity of the optical function elements is $7\times10^{-6}$, and the depth of modulation reaches 49 dB. This further proves that the spatial light modulator may realize regulation of grayscale.

Embodiment 4

Figure 6:
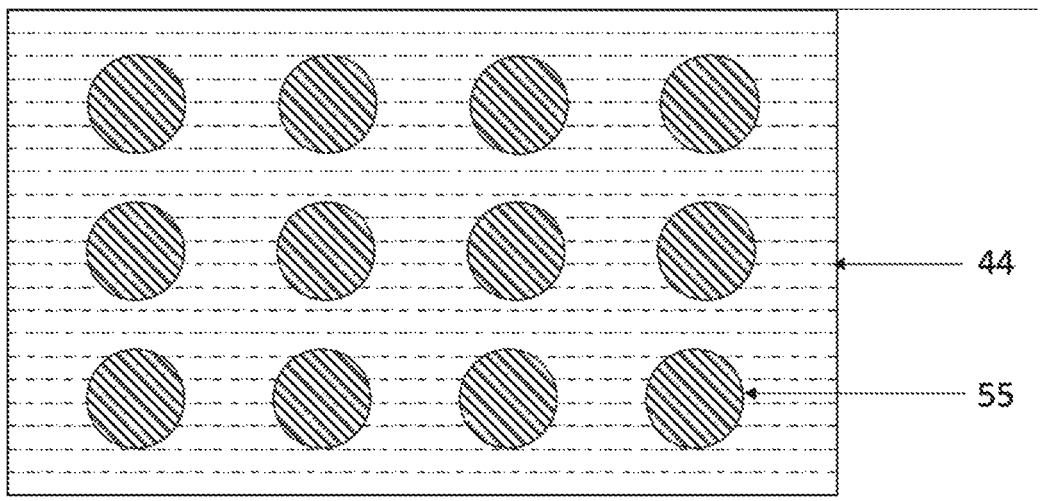
FIG. 6 is a top view of a spatial light modulator based on a metamaterial structure applying a disk-like nanostructure according to still another optional implementation of the present invention.
Figure 11:
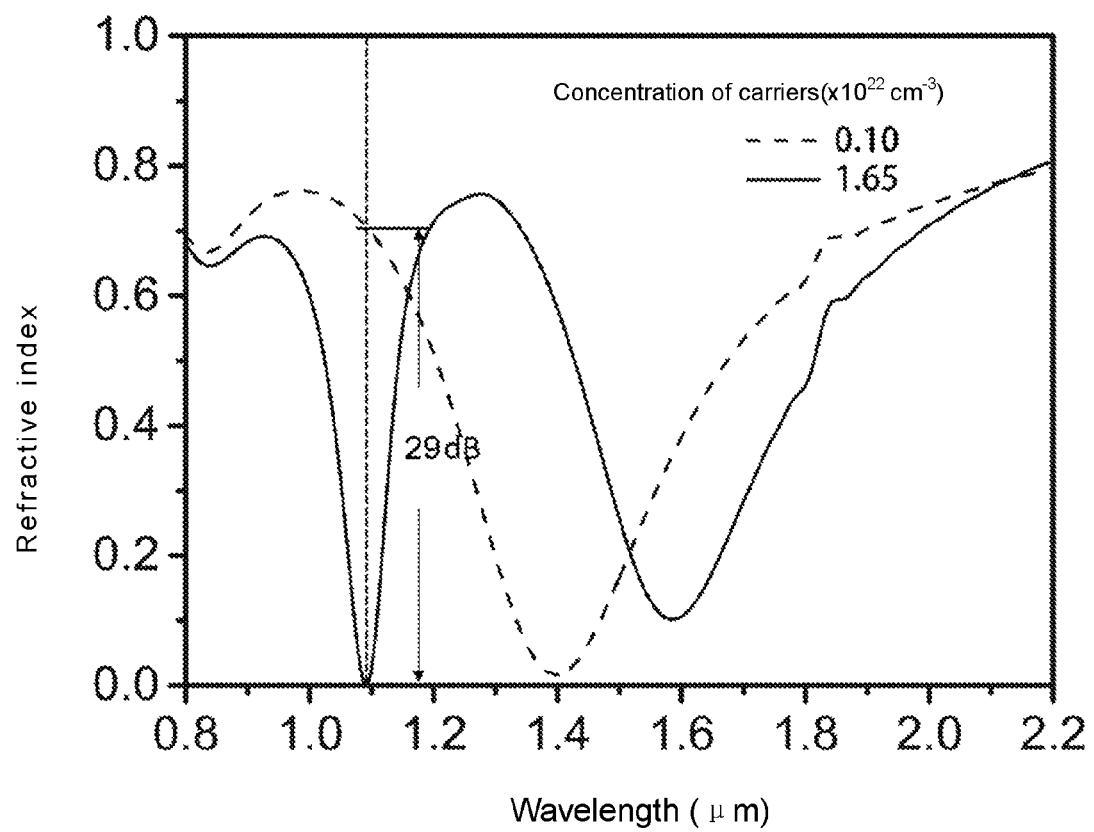
FIG. 11 is a working state diagram of the spatial light modulator, having a high modulation rate, based on a metamaterial structure according to still another optional implementation.

Unlike Embodiment 2 and Embodiment 3, a periodic metal nanostructure layer 55 employed in this embodiment is a metal disk-like array structure, referring to FIG. 2 and FIG. 6. Structures of the device are selected as follows: the thickness of the metal nanostructure layer 55 is 30 nm, and the metal nanostructure layer 55 is an aluminum disk-like array structure, the radius of which is 130 nm and the period of which is 300 nm; the thickness of the nonmetal conducting material layer 44 is 10 nm; the thickness of the medium layer 33 is 15 nm; and the thickness of the metal reflector 22 is 90 nm. As shown in FIG. 11, the concentration of carriers in the nonmetal conducting material layer 44 (ITO) is $1 \times 10^{21}$ cm$^{-3}$ when there is no bias voltage; the reflectivity of the optical function elements is 0.71 at a working wavelength of 1.091 μm, when the polarization direction of the incident light is perpendicular to the grating; when a certain bias voltage is applied so that the concentration of carriers in the carrier accumulation layer in the nonmetal conducting material layer 44 (ITO) is increased to $1.65 \times 10^{22}$ cm$^{-3}$, the reflectivity of the optical function elements is $9 \times 10^{-4}$. The depth of modulator reaches 29 dB. When the voltage is modulated so that the nonmetal conducting material layer 44 (ITO) changes from no carrier accumulation (the concentration of carriers is $1 \times 10^{21}$ cm$^{-3}$) to the concentration of carriers of $1.65 \times 10^{22}$ cm$^{-3}$ in the carrier accumulation layer, the reflectivity of the optical function elements changes from 0.71 to $9 \times 10^{-4}$, and regulation of grayscale may be realized. Additionally, at a working wavelength of 1.4 μm, in two states, i.e., with no bias voltage and under a certain bias voltage, the reflectivity of the optical function elements has a modulation amplitude of 50%. Therefore, the device can work at double wavelengths and improve the interference resistance performance.

Embodiment 5

Figure 12:
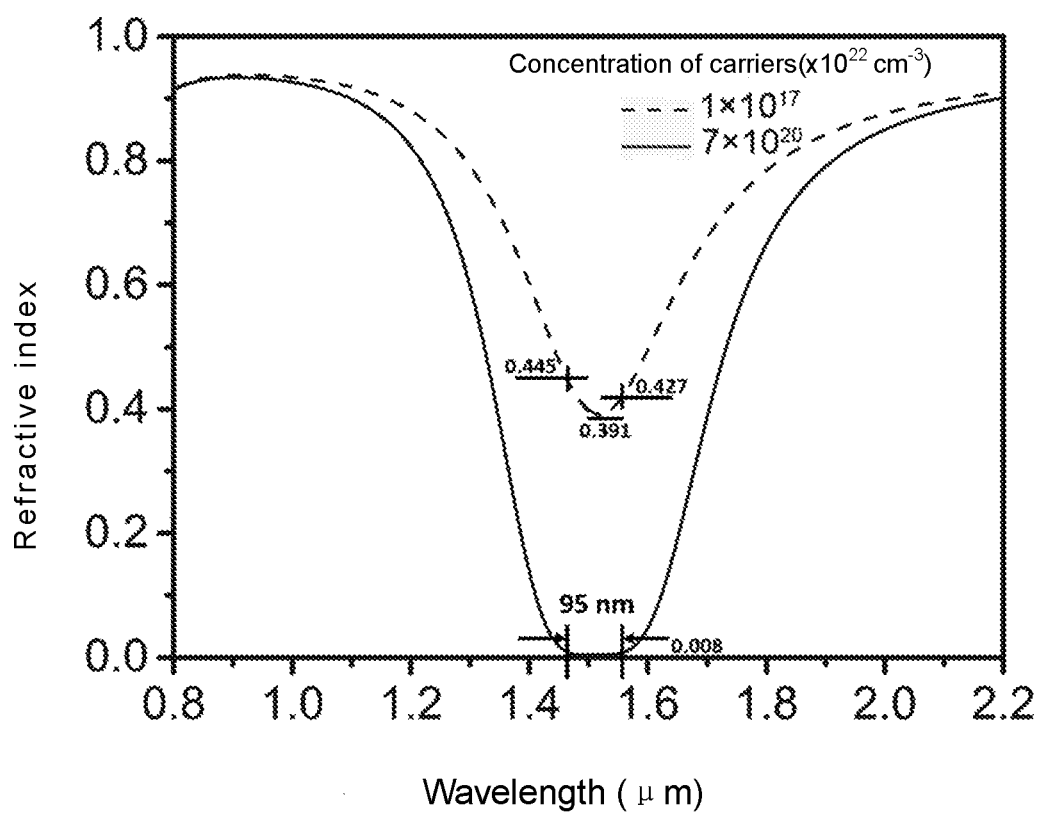
FIG. 12 is a working state diagram of the spatial light modulator, having a high modulation rate, based on a metamaterial structure according to still another optional implementation.

The structure of this embodiment is similar to that of Embodiment 1 but does not include the transparent protection layer, and the medium layer 33 is Al$_2$O$_3$. Structures of the device are selected as follows: the metal is gold; the thickness of the metal nanostructure layer 55 is 55 nm, and furthermore, the metal nanostructure layer 55 is a one-dimensional grating structure, and the width of the metal grating is 200 nm and the period thereof is 300 nm; the thickness of the nonmetal conducting material layer 44 is 10 nm; the thickness of the medium layer 33 is 15 nm; and the thickness of the metal reflector 22 is 55 nm. As shown in FIG. 12, when a bias voltage is applied so that depletion of carriers occurs in the nonmetal conducting material layer 44, the concentration of carriers in the interface between the corresponding nonmetal conducting material layer 44 and the medium layer 33 is $1 \times 10^{17}$ cm$^{-3}$; the reflectivity of the optical function elements is 0.39 at a working wavelength of 1.52 μm and the reflectivity is not less than 0.39 within 95 nm wavelength regarding the 1.52 μm as a center, when the polarization direction of the incident light is perpendicular to the grating; and when a bias voltage is applied so that accumulation of carriers occurs in the nonmetal conducting material layer 44, the concentration of carriers in the interface between the corresponding nonmetal conducting material layer 44 and the medium layer 33 is $7 \times 10^{20}$ cm$^{-3}$, the reflectivity of the optical function elements is less than $8 \times 10^{-3}$ within a 95 nm wavelength regarding 1.52 μm as a center. Therefore, the depth of modulation is greater than 13 dB within the whole 95 nm wavelength, and the bandwidth modulation is realized. Furthermore, the device can work in two states, i.e., carrier depletion and carrier accumulation.

Embodiment 6

Figure 13:
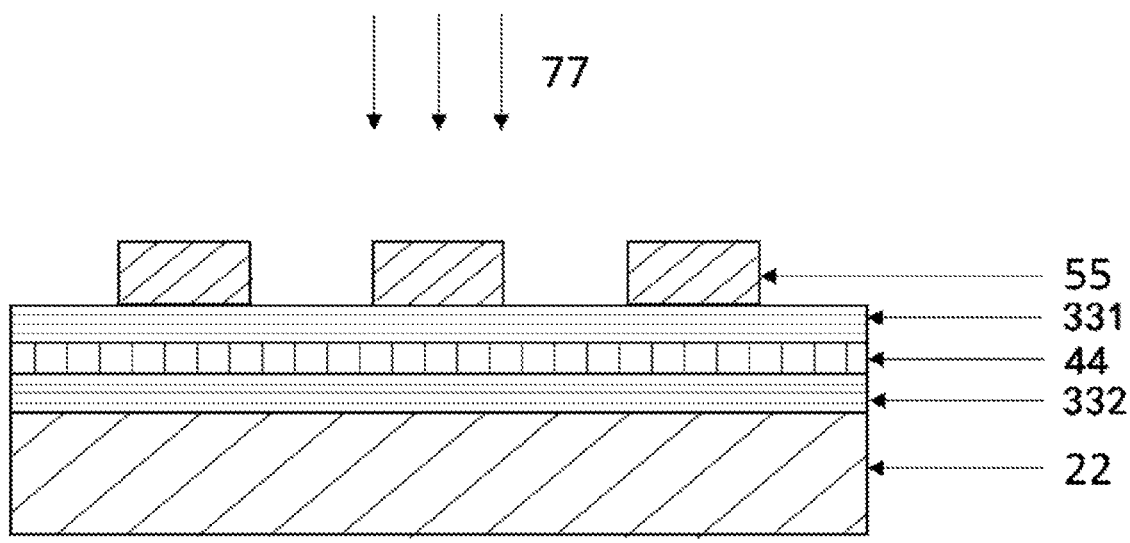
FIG. 13 is a longitudinal cross-section view of the spatial light modulator based on a metamaterial structure according to yet another optional implementation of the present invention.
Figure 14:
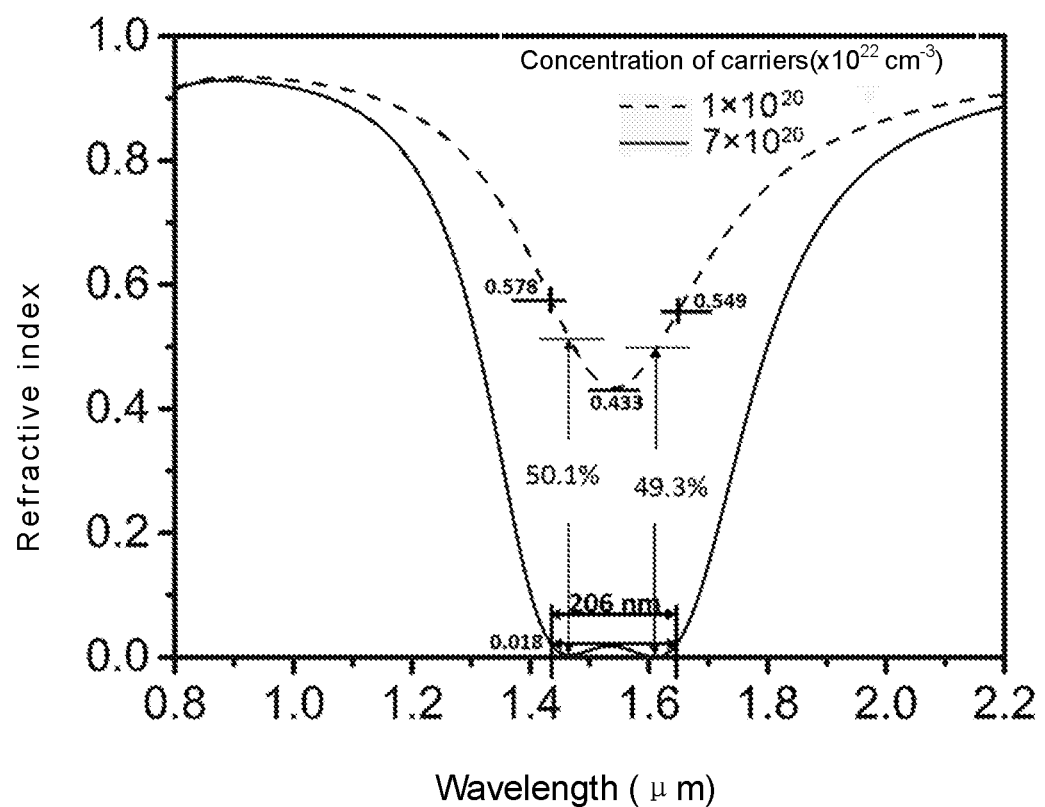
FIG. 14 is a working state diagram of the spatial light modulator, having a high modulation rate, based on a metamaterial structure according to yet another optional implementation.

Unlike the aforementioned five embodiments, there are two medium layers 331 and 332 in this embodiment, which separate the nonmetal conducting material layer 44 from the metal nanostructure layer 55 and from the metal reflector 22, respectively, and the structure thereof is as shown in FIG. 13. The metal is gold; the thickness of the metal nanostructure layer 55 is 50 nm, and furthermore, the metal nanostructure layer 55 is a one-dimensional grating structure, and the width of the metal grating is 210 nm and the period thereof is 300 nm; the thickness of the nonmetal conducting material layer 44 is 10 nm; the medium layers 331 and 332 are Al$_2$O$_3$ in 10 nm thick; and the thickness of the metal reflector 22 is 55 nm. As shown in FIG. 14, the concentration of carriers in the nonmetal conducting material layer 44 (ITO) is $1 \times 10^{20}$ cm$^{-3}$ when there is no bias voltage (0 V); the reflectivity of the optical function elements is 0.52 at a working wavelength of 1.47 μm when the polarization direction of the incident light is perpendicular to the grating; when a certain bias voltage (for example, 1 V) is applied so that accumulation of carriers occurs in the interface between the nonmetal conducting material layer 44 (ITO) and the medium layers 331 and 332 and the concentration of carriers is increased to $7 \times 10^{20}$ cm$^{-3}$, the reflectivity of the optical function elements is less than $5 \times 10^{-4}$ at a working wavelength of 1.61 μm, and the depth of modulation exceeds 25 dB; additionally, at a working wavelength of 1.47 μm, the reflectivity of the optical function elements is 0.501 and $3 \times 10^{-3}$, with and without a bias voltage, respectively, and the modulation amplitude also reaches 50%. The reflectivity of the optical function elements, within a 190 nm wavelength from 1.44 μm to 1.65 μm, is less than $1.8 \times 10^{-2}$ under a bias voltage, and greater than 43% when there is no bias voltage. This realizes wideband reflected light modulation. Such a multi-layer structure realizes high light modulation contrast, by increasing the accumulation of multi-layer carriers when the concentration of carriers is low ($7 \times 10^{20}$ cm$^{-3}$). Additionally, the wideband light modulation is realized by optimizing the structure. In addition to the multi-layer structure specifically shown in this embodiment, a multi-layer medium layer and a nonmetal conducting material layer may be included, which will not be repeated herein.

Embodiment 7

Figure 15:
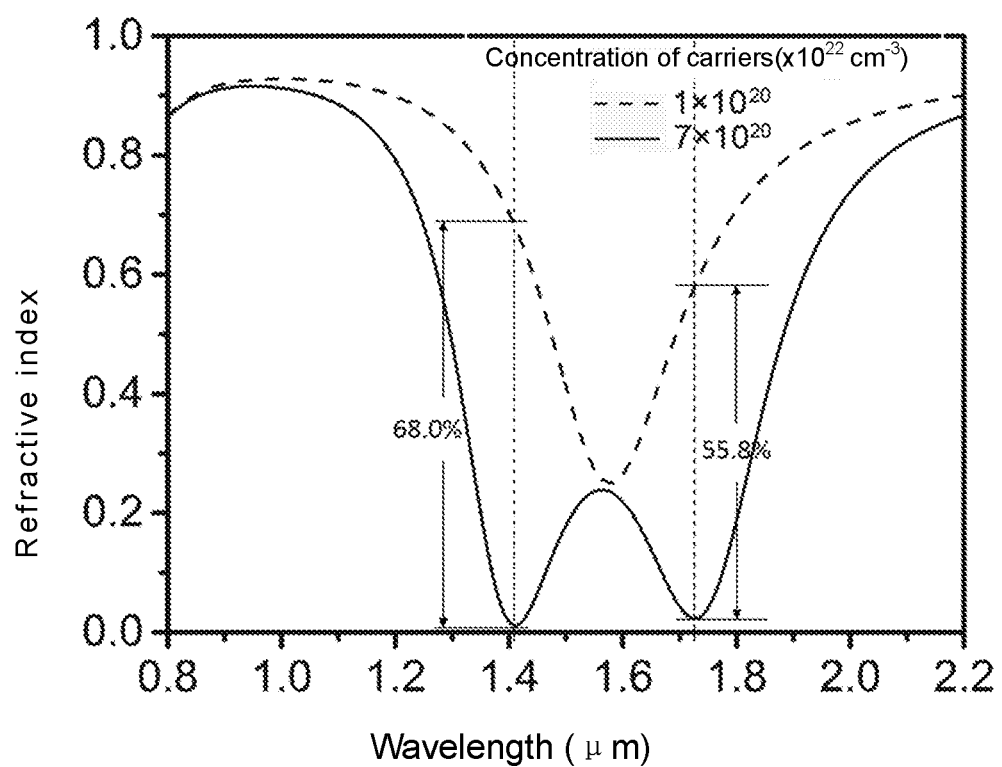
FIG. 15 is a working state diagram of the spatial light modulator, having a high modulation rate, based on a metamaterial structure according to a further optional implementation.

The structure of this embodiment is similar to that of Embodiment 6. The metal is gold; the thickness of the metal nanostructure layer 55 is 80 nm, and furthermore, the metal nanostructure layer 55 is a one-dimensional grating structure, and the width of the metal grating is 210 nm and the period thereof is 400 nm; the thickness of the nonmetal conducting material layer 44 is 10 nm; the medium layers 331 and 332 are Al$_2$O$_3$ in 6 nm thick; and the thickness of the metal reflector 22 is 55 nm. As shown in FIG. 15, the concentration of carriers in the nonmetal conducting material layer 44 (ITO) is $1 \times 10^{20}$ cm$^{-3}$ when there is no bias voltage (0 V); the reflectivity of the optical function elements is 0.69 at a working wavelength of 1.408 μm, when the polarization direction of the incident light is perpendicular to the grating; when a certain bias voltage (for example, 1 V) is applied so that accumulation of carriers occurs in the interface between the nonmetal conducting material layer 44 (ITO) and the medium layers 331 and 332 and the concentration of carriers is increased to $7 \times 10^{20}$ cm$^{-3}$, the reflectivity of the optical function elements is 0.01 at a working wavelength of 1.408 μm, and the modulation amplitude exceeds 68%; additionally, at a working wavelength of 1.727 μm, the reflectivity of the optical function elements is 0.58 and 0.02, with and without a bias voltage, respectively, and the modulation amplitude also exceeds 55%. Therefore, the device can work at double wavelengths and improve the interference resistance performance.

What disclosed in the present invention is one or more preferred embodiments, and any partial changes or modifications easily to be deduced by those skilled in the art, as they are derived from the technical concept of the present invention, shall be regard as not departing from the patent right scope of the present invention.

The invention claimed is:

1. A spatial light modulator based on a metamaterial structure, comprising an array of optical function elements wherein each optical function element comprises a metamaterial structure comprising a metal nanostructure layer and a metal reflector layer, with a medium layer and a nonmetal conducting material layer being provided between the metal nanostructure layer and the metal reflector layer; and an impedance of the metamaterial structure, at a set frequency and under a set bias voltage, is equal to or approximate to 376.7Ω, where "approximate to" means that the deviation amplitude is within ±5%.

2. The spatial light modulator based on a metamaterial structure according to claim 1, wherein:

the metamaterial structure further comprises a substrate on which the metal reflector layer or the metal nanostructure layer is arranged;

and the metamaterial structure further comprises a transparent protection layer provided on the metal nanostructure layer or the metal reflector layer.

3. The spatial light modulator based on a metamaterial structure according to claim 1, wherein the medium layer is distributed between the nonmetal conducting material layer and each of the metal nanostructure layer and the metal reflector layer.

4. The spatial light modulator based on a metamaterial structure according to claim 1, wherein the metal nanostructure layer and the metal reflector layer comprise a single-metal layer formed of any one or an alloy layer formed of more than any two of gold, platinum, silver, copper, aluminum and titanium.

5. The spatial light modulator based on a metamaterial structure according to claim 4, wherein the metal nanostructure layer and the metal reflector layer comprise a stacked structure formed of more than two single-metal layers, more than two alloy layers, or, more than one single-metal layer and more than one alloy layer.

6. The spatial light modulator based on a metamaterial structure according to claim 1, wherein the metal nanostructure layer comprises a one-dimensional or two-dimensional grating.

7. The spatial light modulator based on a metamaterial structure according to claim 6, wherein a period of the grating is 100 nm to 2000 nm, and a thickness thereof is 5 nm to 100 nm.

8. The spatial light modulator based on a metamaterial structure according to claim 1, wherein a thickness of the metal reflector layer is over 50 nm and below 200 nm.

9. The spatial light modulator based on a metamaterial structure according to claim 1, wherein a thickness of the medium layer is 5 nm to 100 nm.

10. The spatial light modulator based on a metamaterial structure according to claim 1, wherein:

material of the medium layer comprises silicon dioxide, silicon nitride, magnesium fluoride, zinc selenide or aluminum oxide;

and material for forming the nonmetal conducting material layer comprises indium tin oxide, zinc oxide, tin oxide, indium oxide, titanium nitride, zirconium nitride, and single-layer or multi-layer graphene.

11. The spatial light modulator based on a metamaterial structure according to claim 1, wherein a transport protection layer disposed above the nonmetal conducting material layer and surrounding the metal nanostructure layer comprises silicon dioxide, silicon nitrogen or aluminum oxide.

12. The spatial light modulator based on a metamaterial structure according to claim 1, wherein:

a working wavelength bandwidth of the spatial light modulator is 50 nm to 200 nm.

* * * * *